United States Patent
Nambiar et al.

(10) Patent No.: US 10,228,913 B2
(45) Date of Patent: Mar. 12, 2019

(54) FUNCTIONAL RULE AND COMPONENT STORAGE

(71) Applicant: ORACLE INTERNATIONAL CORPORATION, Redwood Shores, CA (US)

(72) Inventors: Shibhu Nambiar, Springfield, VA (US); Rohit Lobo Prabhu, Santa Clara, CA (US); Manjula Evans, Fort Lauderdale, FL (US); Suman Guha, Fremont, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 945 days.

(21) Appl. No.: 14/022,711

(22) Filed: Sep. 10, 2013

(65) Prior Publication Data

US 2015/0074641 A1 Mar. 12, 2015

(51) Int. Cl.
*G06F 17/50* (2006.01)
*G06F 8/20* (2018.01)
*G06F 8/71* (2018.01)
*G06F 8/36* (2018.01)

(52) U.S. Cl.
CPC .............. *G06F 8/20* (2013.01); *G06F 8/71* (2013.01); *G06F 8/36* (2013.01)

(58) Field of Classification Search
None
See application file for complete search history.

(56) References Cited

U.S. PATENT DOCUMENTS

| | | | | |
|---|---|---|---|---|
| 4,558,413 A * | 12/1985 | Schmidt | ................... | G06F 8/71 707/695 |
| 8,205,189 B2 * | 6/2012 | Grossman | ................. | G06F 8/70 707/600 |
| 8,271,541 B2 | 9/2012 | Mohan et al. | | |
| 2004/0162741 A1 | 8/2004 | Flaxer et al. | | |
| 2007/0016615 A1 * | 1/2007 | Mohan | ..................... | G06F 8/20 |

(Continued)

OTHER PUBLICATIONS

Andreescu, A., et al., "Managing Knowledge as Business Rules", *Informatica Economics*, vol. 13, No. 4, 2009, pp. 63-74.

(Continued)

*Primary Examiner* — Aniss Chad
*Assistant Examiner* — Nithya J. Moll
(74) *Attorney, Agent, or Firm* — Kilpatrick Townsend & Stockton, LLP

(57) ABSTRACT

A method of managing software design specifications with functional rule versioning may include storing references to a plurality of software components in a database system, and storing references to a plurality of functional rules in the database system. In some embodiments, the functional rules may define behaviors that may be assigned to the plurality of software components. The method may also include receiving a selection of one or more software components from the plurality of software components. The one or more software components may define a software product. The method may additionally include receiving assignments of the plurality of functional rules to the one or more software components, and providing an interface for navigating through the one or more software components and editing the assignments.

20 Claims, 20 Drawing Sheets

(56) References Cited

U.S. PATENT DOCUMENTS

| | | | |
|---|---|---|---|
| 2009/0030866 A1* | 1/2009 | Aoyama | G06F 17/30707 706/47 |
| 2009/0049422 A1* | 2/2009 | Hage | G06F 8/10 717/104 |
| 2012/0310850 A1* | 12/2012 | Zeng | G06N 5/02 705/317 |
| 2013/0030827 A1 | 1/2013 | Snyder et al. | |
| 2013/0031566 A1* | 1/2013 | Sureshan | G06F 13/00 719/313 |
| 2013/0061161 A1 | 3/2013 | Schwartz et al. | |

OTHER PUBLICATIONS

Gottesdiener, E. "Business Rules: Show Power, Promise", *Application Development Trends*, vol. 4, No. 3, Mar. 1997, 22 pages.

Graham, I. *Business Rules Management and Service Oriented Architecture: A Pattern Language*, John Wiley & sons, Ltd., West Sussex, England, 2006, pp. 1-181.

Graham, I. "Service Oriented Business Rules Management Systems", TriReme, Version 2, Mar. 6, 2005, 75 pages.

Pant, K., et al. "Business Rules Management, BPM, and SOA", Packt Publishing, Retrieved on Apr. 19, 2013 from http://www.packtpub.com/article/business-rules-management-bpm-and-soa.

Vasilecas, O., et al. "Business Rule Based Configuration Management and Software System Implementation Using Decision Tables", Local Proceedings of ADBIS 2007, 2007, pp. 27-37.

Vasilecas, O., et al. "Business Rules Repository for Business Rules represented Using UML", International Conference on Computer Systems and Technologies, CompSysTEch, 2005, 6 pages.

\* cited by examiner

FUNCTIONAL RULE AND COMPONENT STORAGE

BACKGROUND

In many structured software design methodologies, a software design document is a written description of a software product. Typically, a software designer may develop a software design document in order to provide a software development team guidance during the design of the overall architecture and individual functionalities of a software project. The software design document may include a detailed list of specifications that define how the software will behave according to various possible inputs. An overall design may be included such that a software development team can operate according to a single vision, while also providing details such as a data design, an architecture design, an interface design, and/or a procedural design. The complexity of a software design document can generally be considered proportional to the complexity of the underlying software project.

BRIEF SUMMARY

In one embodiment, a method of managing software design specifications with functional rule versioning may be presented. The method may include storing references to a plurality of software components in a database system, and storing references to a plurality of functional rules in the database system. In some embodiments, the functional rules may define behaviors that may be assigned to the plurality of software components. The method may also include receiving a selection of one or more software components from the plurality of software components. The one or more software components may define a software product. The method may additionally include receiving assignments of the plurality of functional rules to the one or more software components, and providing an interface for navigating through the one or more software components and editing the assignments.

In some embodiments, the method may further include receiving an assignment of a first functional rule to a first software component, where the first software component may be part of a first selection of software components that defines a first software product, and receiving an assignment of the first functional rule to a second software component, where the second software component may be part of a second selection of software components that defines a second software product. The method may also include receiving a change to the first functional rule and archiving a history of changes to the first functional rule in the database system. The method may additionally include receiving a query for the first functional rule and providing an output. The output may include a definition of the first functional rule, the history of changes to the first functional rule, an indication that the first functional rule is assigned to the first software component, and/or an indication that the first functional rule is assigned to the second software component. The method may further include receiving an assignment of a first functional rule to a first software component, where the first software component may be part of a first selection of software components that defines a first software product, and receiving an assignment of a second functional rule to the first software component, where the first software component may be part of a second selection of software components that defines a second software product. The method may also include providing a graphical display of the logical hierarchy, receiving a selection of a first software component in the logical hierarchy, and providing a listing of each functional rule assigned to the first software component. The method may additionally include receiving a query for a first software product, and providing an output comprising a listing of each functional rule assigned to software components of the first software product.

In some embodiments, the plurality of software components may include graphical components of a Graphical User Interface (GUI). The selection of one or more software components may be related to each other in a logical hierarchy. The software product may include a GUI for a purchasing application of an Enterprise Software Suite. Each of the functional rules may be assigned a category.

In another embodiment, a computer-readable memory may be presented. The computer-readable memory may comprise a sequence of instructions which, when executed by one or more processors, causes the one or more processors to manage software design specifications with functional rule versioning. The instructions may cause the processor(s) to store references to a plurality of software components in a database system, and store references to a plurality of functional rules in the database system. In some embodiments, the functional rules may define behaviors that may be assigned to the plurality of software components. The instructions may also cause the processor(s) to receive a selection of one or more software components from the plurality of software components. The one or more software components may define a software product. The instructions may additionally cause the processor(s) to receive assignments of the plurality of functional rules to the one or more software components, and provide an interface for navigating through the one or more software components and editing the assignments.

In yet another embodiment, a system may be presented. The system may include one or more processors and a memory communicatively coupled with and readable by the one or more processors. The memory may comprise a sequence of instructions which, when executed by the one or more processors, cause the one or more processors to manage software design specifications with functional rule versioning. The instructions may cause the processor(s) to store references to a plurality of software components in a database system, and store references to a plurality of functional rules in the database system. In some embodiments, the functional rules may define behaviors that may be assigned to the plurality of software components. The instructions may also cause the processor(s) to receive a selection of one or more software components from the plurality of software components. The one or more software components may define a software product. The instructions may additionally cause the processor(s) to receive assignments of the plurality of functional rules to the one or more software components, and provide an interface for navigating through the one or more software components and editing the assignments.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 16 illustrates an example of a functional rule print report, according to one embodiment.

FIG. 19 illustrates an example of a functional rule report for a shareable component, according to one embodiment.

DETAILED DESCRIPTION

Figure 1:
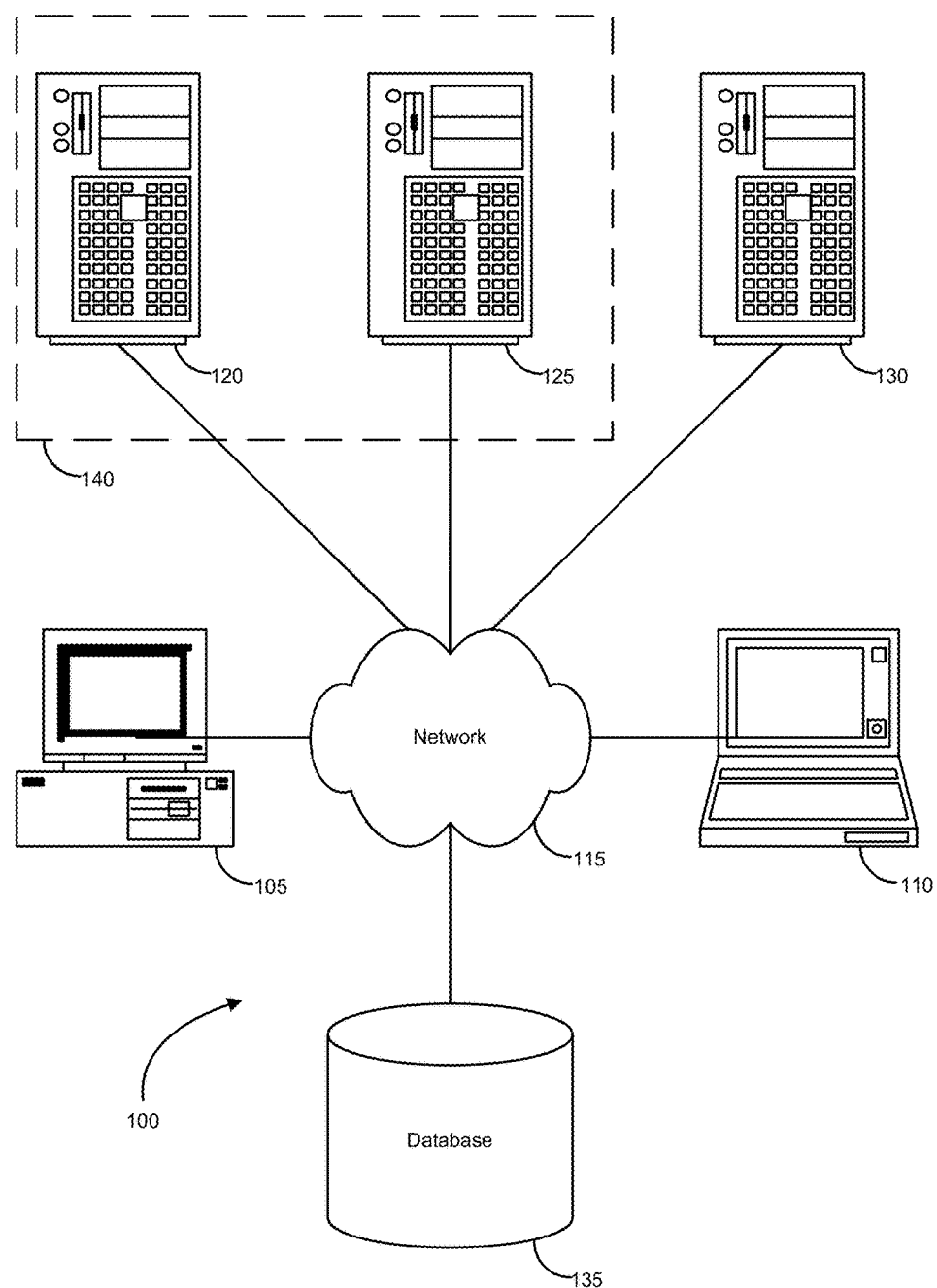
FIG. 1 illustrates a block diagram of components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Each of the embodiments disclosed herein may be implemented in a general-purpose computer system. FIG. 1 is a block diagram illustrating components of an exemplary operating environment in which various embodiments of the present invention may be implemented. The system 100 can include one or more user computers 105, 110, which may be used to operate a client, whether a dedicated application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
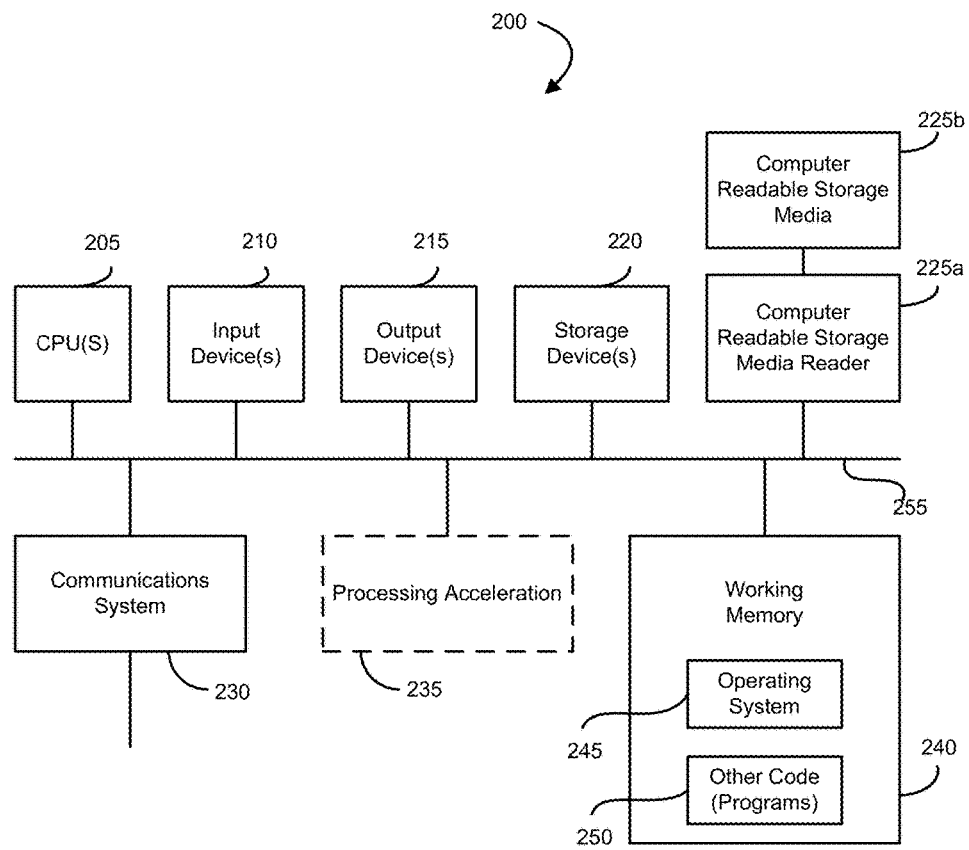
FIG. 2 illustrates a block diagram of an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Each of the methods described herein may be implemented by a computer system, such as computer system 200 in FIG. 2. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed by the computed without human intervention. Therefore, it will be understood in light of this disclosure, that each step and each method described herein may be altered to include an input and output to and from a user, or may be done automatically by a computer system. Furthermore, some embodiments of each of the methods described herein may be implemented as a set of instructions stored on a tangible, non-transitory storage medium to form a tangible software product.

Described herein are embodiments for managing a software development design and maintaining a version-specific repository for functional rules. A software product can be broken down into a series of components and sub components that can be related to each other in a hierarchy. A reference to each component type can be organized in a database. Components can be associated with functional rule sets and reused across multiple software designs. Each component instance and functional rule can be associated with a particular software product and/or release version. An interface can be provided that allows users to quickly and efficiently see the current or historical status of any software component or product, along with different functional rule versions and how they have changed over time.

These embodiments offer structure and predictability to what is normally a very chaotic software design process by addressing elements such as recording application behavior at the most granular level, structuring design components in a hierarchical fashion, and offering an easily searchable, editable, and printable set of functional rules in an understandable format. Given the many software development methodologies that are currently available, it can be argued that the software development process has arrived at a fairly mature state. However, the tools are used to capture, communicate, and manage functional design specifications are still rudimentary at best. For example, software solutions such as Scrum®, Extreme Programming®, and Lean Software Development® are not configured to provide an adaptable framework for software changes over time.

The basic foundation of a functional design for any software project is a set of pages, programs, functions, workflows, and/or the like. As used herein, these may be referred to as "software components," or simply "components" and may be interpreted as logical and/or functional units of design that accomplish a certain user task, which can be developed as a logical unit and tested as a logical unit. Examples of software components may include user interfaces (UIs), application programming interfaces (APIs), software processes, and/or the like. Each component can be subdivided into various sub components (which are also considered components in this disclosure). For example, a UI solution component can be subdivided into pages, tabs, regions, sub-regions, attributes, and/or the like. Similarly, a backend solution component can be divided into broad categories such as derivation, validation, processing, user messages, and/or the like. Components and sub components can be further subdivided down to a level of granularity where basic functions are described.

A software design specification authored on top of these components and sub components describes the behavior of the software application. Typically, a list of solution components can be laid out in a Microsoft Excel or Microsoft Word document. These documents are typically authored during the initial release of the software, but often do not play a large role throughout the software lifecycle. After a few release cycles, these design documents are not typically kept up to date, and may only be useful for generally describing the structure of the software application.

By way of example, most functional design specifications are offered in a text document, such as Microsoft Word. One or more documents are created for each project within a specific software release. Tracking changes in these text-based specifications over the lifecycle of a project is a difficult exercise using traditional wordprocessing programs. As a result, design document authors rely on a variety of font colors, styles, effects, and other methods that unfortunately add unnecessary complexity to these documents rather than clarity.

Additionally, design specifications are typically limited to a specific release. Therefore software designers are faced with the extra challenge of reading not only documents pertinent to the current release, but also documents from previous releases in order to fully grasp the current state of the software application behavior. Due to the size of most text-based design documents and the number of documents spanning the history of a software application, it is very likely that a design change or application bug fix may generally cause undesired consequences that are difficult to detect simply by analyzing the design document for each release. It is possible that cross-project dependencies will be missed because different designers generally work on different design documents independently and are not required to communicate intricate details of the project with others.

The embodiments described herein may address these and many other problems in the software design documentation process by providing an ability to record application behavior as a set of functional rules at the most granular level. Also, embodiments herein may provide the ability to record metadata about a functional rule to provide context for the rule's behavior across software releases. These embodiments may organize solution components and functional rules in a logical hierarchy and provide an interface that allows designers to view, manage, and edit a historical software design. Functional rules and components may be shared and/or reused across multiple software projects and across multiple levels of the same project.

As used herein, the term "functional rule" may refer to the smallest entity of a functional design specification that a programmer can code and a quality assurance engineer can test. Functional rules may be written for a particular software component. For example, a UI for procurement department may include an "Edit Order" component that allows users to manage a pending order. This component may have a sub component, or widget, called "Price" that represents the price of the item being procured on a purchase order. A functional rule can be applied to the "Price" component that implements the logical expression: "if a price is not entered, then provide an error message to the user." Functional rules may also be referred to as business rules. In some embodiments, the purchase order product may be part of an Enterprise Software Suite (ESS).

The ensuing description will provide a detailed description of various embodiments for managing software components and functional rules. Merely by way of example, some of these embodiments may refer specifically to a user interface software product. It will be understood that the user interface example is not meant to be limiting, but is meant to provide an understanding of how one exemplary implementation may be made and used by one having skill in the art. It will also be understood that the systems, methods, and products described herein may be readily adapted to be used with any software development process, including database designs, backend designs, game designs, application designs, webpage design, and/or the like.

Figure 3:
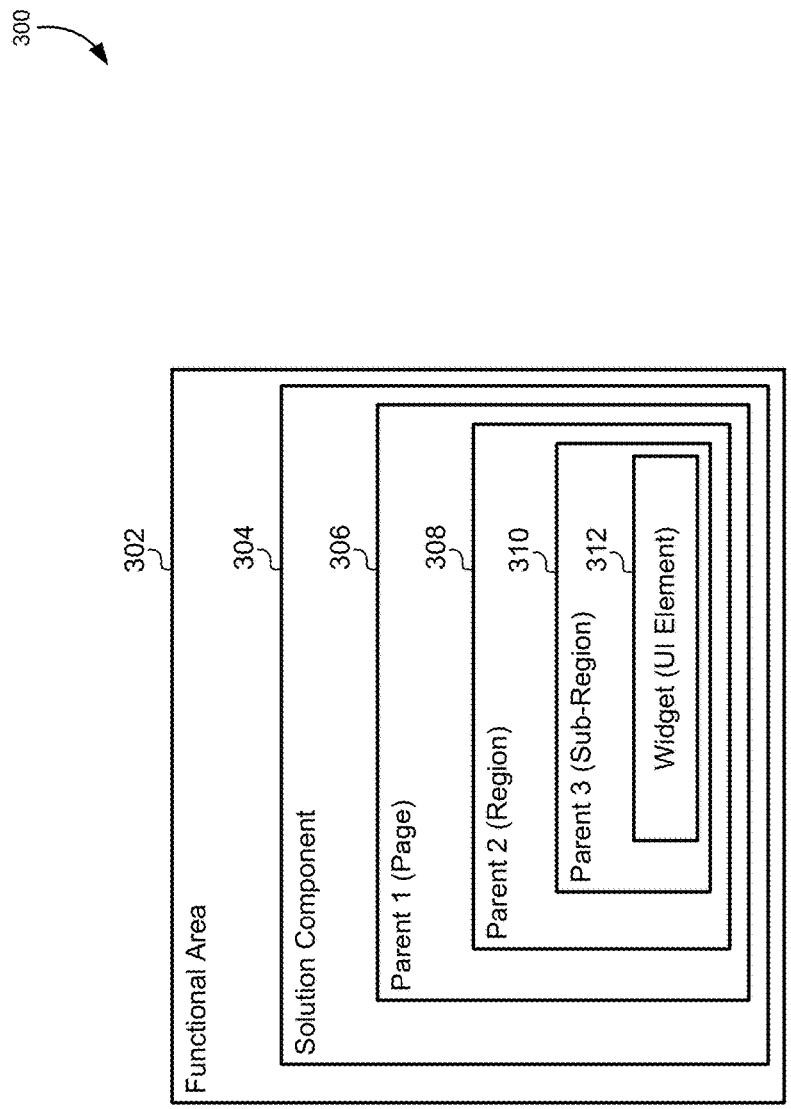
FIG. 3 illustrates a hierarchical organization of software components, according to one embodiment.

FIG. 3 illustrates a hierarchical oragnization 300 of software components, according to one embodiment. As described above, software components can be categorized and arranged in a hierarchical fashion in order to represent the overall structure and functionality of a software product. In order to link functional rules to each level of software components, a software designer can first organize the different software components in the functional design. For example, in designing a user interface, the software designer can divide the UI into logical and functional components that describe visual elements on the screen.

In the example of FIG. 3, a UI can first be divided into functional areas 302. A functional area 302 may be described as a logical grouping of solution components that comprise a software product or software module. For example, interfaces for creating and managing purchase orders and purchase agreements can be two functional areas 302 in a purchasing software product. Moving down one level in the hierarchy, a functional area 302 may include one or more solution components 304. In the context of a UI, a solution component 304 may be considered a set of pages, an interface, or program that a user may interact with when performing a certain task or operation within the overall software product. For example, user controls for operations such as "Edit Order," "View Order," and "Import Purchase Orders" may be considered three solution components 304 within the purchase order functional area 302.

Note that both functional areas 302 and solution components 304 may be described generically as software components (or simply components) in this disclosure. Further software components may also be organized as components under the functional area 302 or solution component 304. For example, the hierarchical organization 300 may include a component 306 of the solution component 304 representing a webpage. At the next level, component 308 may represent a region on the webpage represented by component 306. At the next level, component 310 may represent a subregion within the region represented by component 308. Finally, component 312 may represent a widget for a UI element that is located within the subregion represented by component 310.

In the context of these embodiments, the various software components refer to functional descriptions of the components. The actual components will be implemented in code in the actual software product and may be implemented according to the design specification by programmers. However, in this context, the components may comprise a description of the functional requirements of the software components, as we found in a traditional software design specification document.

Figure 4:
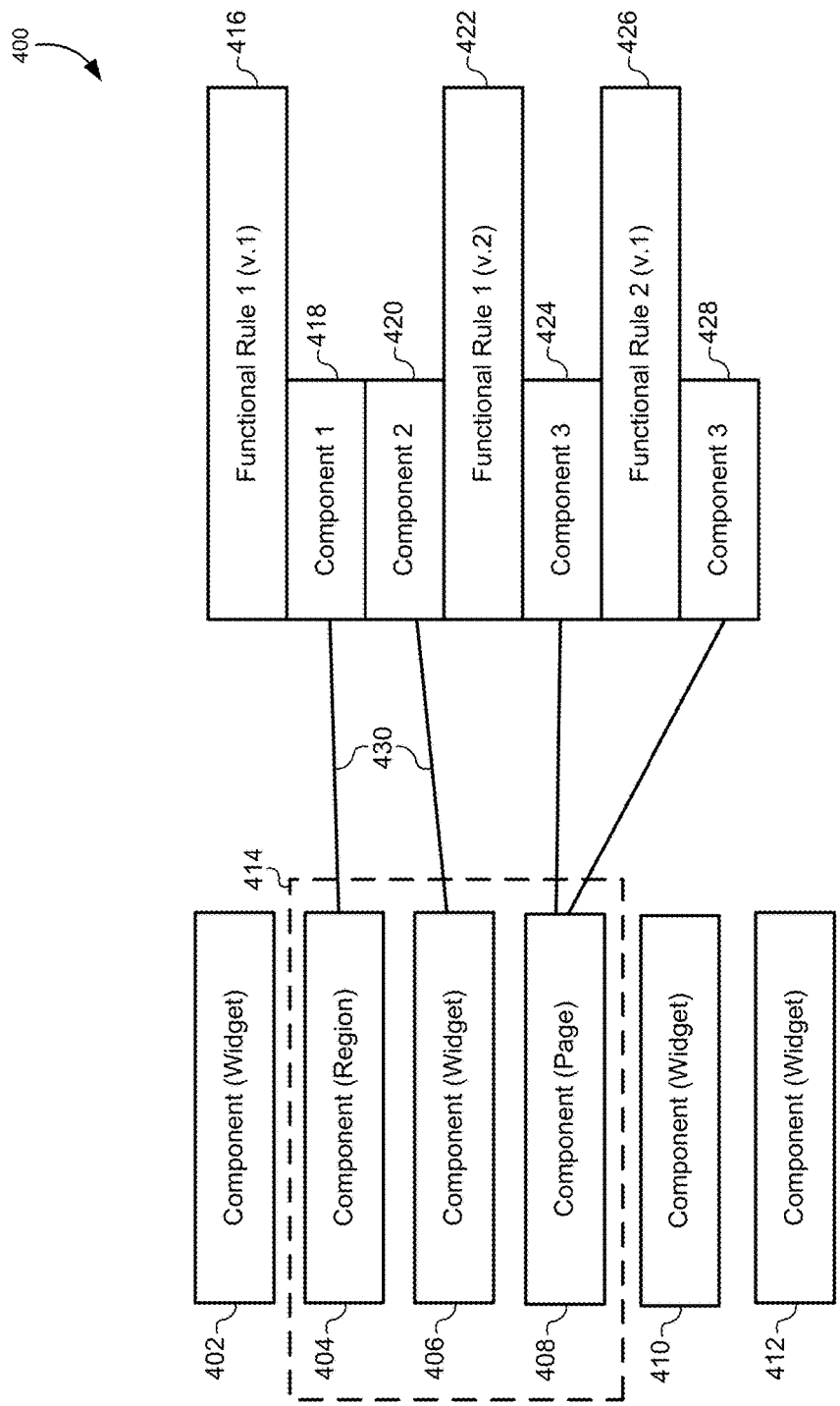
FIG. 4 illustrates a block diagram of software components associated with functional rules, according to one embodiment.

FIG. 4 illustrates a block diagram 400 of software components associated with functional rules, according to one embodiment. Block diagram 400 illustrates how a software designer can create a software design specification using pre-existing components and functional rules. First, a library of components may be presented to a designer. Additionally or alternatively, the designer may design new components as needed. A designer may then select from a plurality of components 402, 404, 406, 408, 410, 412, in order to choose one or more of the components 404, 406, 408 to be used in the software design. The selection of components 414 may include multiple instances of a single component type. For example, component 406 may represent a button widget on a webpage. The particular software product may include multiple instances of the button widget represented by component 406. In some embodiments, a graphical interface may be used to arrange and instantiate software components, as will be described further below. Each component may be tagged with a particular software product identifier and/or version identifier. In some cases, each component may additionally be tagged with a product feature identifier and/or a project identifier, as a component may be used in multiple features.

Next, a functionality may be added to one or more of the selection components 414 using a pre-existing set of functional rules. Additionally, a designer may create additional functional rules, or may edit existing functional rules as required by the particular software design. Each functional rule 416 may be tagged with a particular software product and/or version identifier. This allows designers to track the evolution of functional rules between various software products and/or versions, while maintaining a database of existing functional rules that can be reused and shared among projects. Additionally, functional rules may also be tagged with a link to each specific component that is associated with the functional rule. This can allow a user to search and see which projects and/or components are using a particular functional rule, as well as allowing users to see which functional rules are assigned to a particular component.

In this particular example, component 404 representing a region on a webpage may be associated with functional rule 416. Additionally, component 406 representing a widget on a webpage may also be associated with functional rule 416. Note that functional rule 416 can be configured to store an indication 418 that is associated with component 404, as well as an indication 420 that is associated with component 406. Although not shown explicitly, components 406 and components 404 may each also store a similar indication that they are associated with functional rule 416. The associations 430 between components and functional rules may be implemented using pointers, references, or keys in a relational database, depending upon the particular embodiment.

Designers may also wish to create a new functional rule based on an existing functional rule, or otherwise edit an existing functional rule to alter its functionality. For example, a functional rule may be configured to verify the contents of an input buffer and display a particular error message if the contents of the buffer do not conform to a text rule. A designer may wish to reuse the same functional rule but change the error message. The designer may then create a new version of the existing functional rule, and this new version can be stored along with the old version in the functional rule database. By maintaining each version of a functional rule, designers can observe how functional rules have changed over time, as well as use previous versions of a functional rule after it has been updated.

In this example, a designer may have updated functional rule 416 to create functional rule 422 representing an updated version of functional rule 416. The designer may also use a different functional rule 426 without any alterations. As described above, both functional rule 422 and functional rule 426 may be bound to components, such as component 408.

Both the selection and arrangement of software components and the assignments and definitions for functional rules may be stored in a database system. Rows in tables of the database system may be used to store functional rule assignments, versions, associations with software products, and/or other metadata associated with the functional rule. Rows in tables may also store instances of software components as well as links between software components to form the structured hierarchy of a software product. Note that the database arrangement is merely exemplary, and many other data structures may also be used to store this information.

Figure 5:
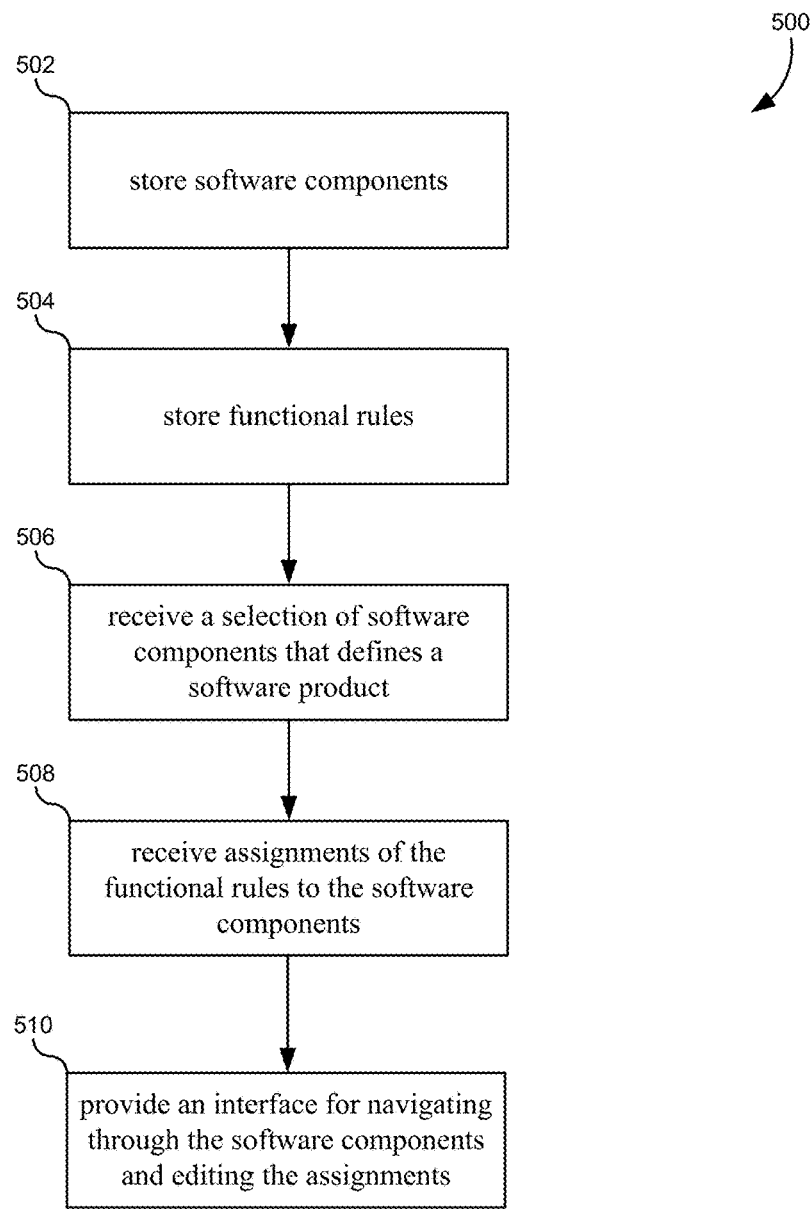
FIG. 5 illustrates a flowchart of a method for managing software design specifications with functional rule versioning, according to one embodiment.

FIG. 5 illustrates a flowchart of a method for managing functional software design specifications with functional rule versioning, according to one embodiment. The method may include storing references to a plurality of software components in a database system (502). The references to software components may include all the information that would traditionally be included in a written description of a software component in a software design document. In other embodiments, the reference may be a pointer to data stored elsewhere in the database system or otherwise. The plurality of software components may form a library of software components from which a designer may select pre-existing components for reuse within a particular software project. Although not shown explicitly, the method may also include creating new software components or editing existing components to make a new version of the software components.

The method may additionally include storing references to a plurality of functional rules in the database system (504). In some embodiments, the functional rules may define behaviors that may be assigned to the software components. The functional rules for the database system may include textual/logical descriptions of the functionality, as well as pseudocode, actual code, or references to other definitions stored elsewhere in the database system or otherwise. Each functional rule may include version information, software product associations, component associations, and any other metadata describing how the functional rule has been used in any existing software application.

The method may further include receiving a selection of one or more software components from the plurality of software components (506). This step generally describes how a software designer would organize components into a cohesive software design. For example, when designing a UI, the designer could select various UI components (tabs, pages, regions, buttons, drop-down boxes, widgets, etc.) and arrange them in a hierarchical fashion in order to define the logical presentation of the webpage. The selection of one or more software components may define the overall software product. As described above, designers may also edit existing components and/or create new components as part of the selection process.

The method may also include receiving assignments of the plurality of functional rules to the one or more software components (508). These associations may be made using a user interface specially designed for interacting with a database storing functional rules. For example, a user may click on a graphic representation of one of the components in the software design, and then assign a new or existing functional rule to that component to describe its behavior in the software design.

The method may additionally include providing an interface for navigating through the one or more software components and editing their assignments (510). The interface may provide controls that allow a designer to search functional rules and/or components. In the UI example described above, the interface may provide a means to search through functional areas, solution components, and individual widgets in the interface. The interface may be used to make the assignments in step 508 between functional rules and components. The interface may also be used to generate reports or paper versions of a software design specification represented by the selection of components and the assignments of functional rules.

In some embodiments, the interface may allow designers to change a first functional rule and archive a history of the changes in the database system. The method may also include receiving a query for that first functional rule and providing an output of the definition of the first functional rule along with any metadata, including the history of changes, version and/or software product information, and/or a list of software components to which the functional rule has been assigned.

Note that this reusable framework of components and functional rules may allow a functional rule to be assigned to multiple software components. Similarly, multiple functional rules may be assigned to a single software component. Additionally, components and/or functional rules may be shared and reused between different software product definitions.

The interface may also include displaying the selected components in the software product in a logical hierarchy. For example, tree display may be used that illustrates the relationships and hierarchical nature of the software design components. Designers may select any components in the graphical display and generate a list of functional rules assigned to that component. Additionally, a designer could use the interface to generate a listing of functional rules that are used in the entire software product. In some embodiments, a listing of functional rules may be generated for a project that a particular designer is involved currently involved with.

It should be appreciated that the specific steps illustrated in FIG. 5 provide particular methods of managing functional software design specifications according to various embodiments of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

It should be emphasized that the steps a flowchart 500 may be executed in any order. In some embodiments, software components may be created, and a user may navigate the software component tree to select a component, then and add a functional rule association directly to that component. In other embodiments, users may first create shareable software components, and then navigate the shareable software components tree to select a component. Users could then create a second software component and associate the second software component with the shareable software component. A functional rule assigned to the shareable software component will then be inherited by the second software component.

The remaining figures in this disclosure will be used to illustrate a particular embodiment of the interface described in the method of FIG. 5. It will be understood that each of these interfaces is merely exemplary and not meant to be limiting.

Figure 6:
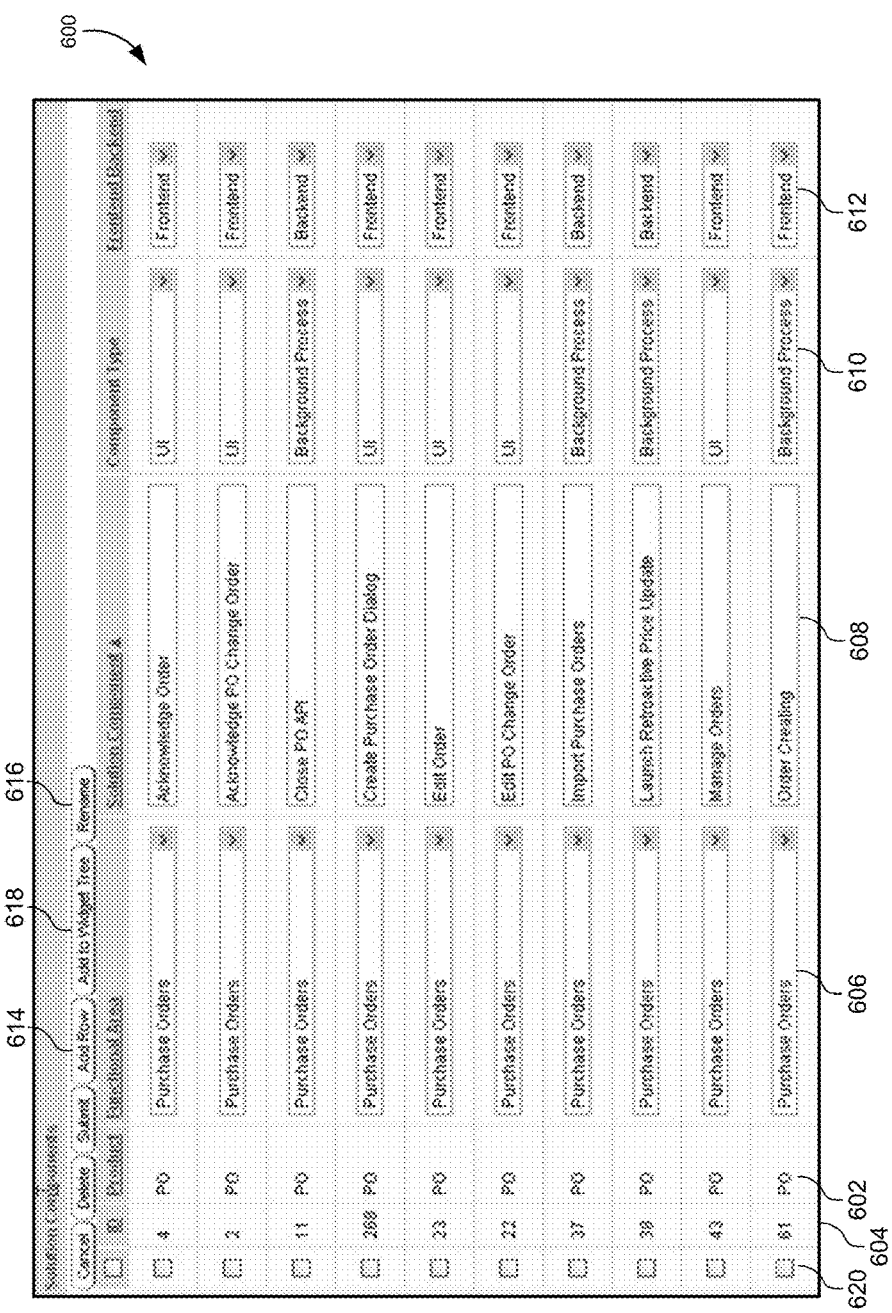
FIG. 6 illustrates an interface for managing components, according to one embodiment.

FIG. 6 illustrates an interface 600 for managing software components, according to one embodiment. Note that each component may belong to a particular product 602, may be assigned a unique ID 604, may be assigned to a functional area 606, may be assigned a descriptive name 608, and may be assigned a component type 610. In this example, each component can also be assigned a frontend/backend attribute 612 to describe whether the component is part of a frontend or backend process. As interface 600 is merely exemplary, it will be understood that each component can have its own set of attributes that may be defined by the software designer in order to fully describe and categorize the component.

Interface 600 may be used to search for components, add new components 614, create a new version of components 616, and/or add selected components to a software design 618 (e.g. assign the components to a widget tree). A selector 620 for each component can be used to designate which components should be subject to each of these operations.

Figure 7:
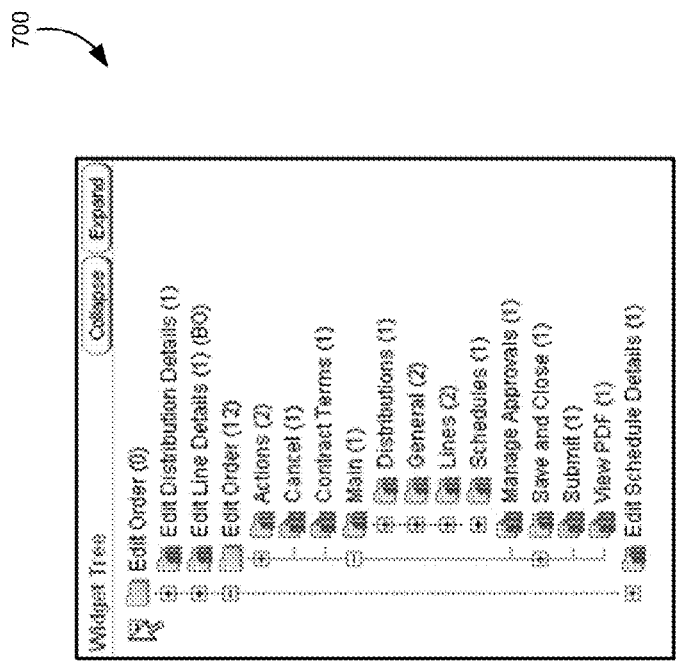
FIG. 7 illustrates an interface for managing widget trees, according to one embodiment.

FIG. 7 illustrates an interface 700 for managing widget trees, according to one embodiment. In this embodiment, each of the components is organized hierarchically into a widget tree that illustrates the parent/child relationship between each of the components. A designer may select components from interface 600 and add them to the widget tree of interface 700. This particular example displays the widget tree for an "Edit Order" interface that was described previously. The "Edit Order" interface may include regions and subregions, along with individual widgets, such as "Cancel" and "Submit" buttons.

A designer may be allowed to drag and/or manipulate the positioning in the hierarchy of each component. Additionally, designers may be allowed to select individual components and be presented with a listing of functional rules assigned to that component. The widget tree of interface 700 may be used generally to navigate through a software design. A widget tree may be a logical representation of a webpage, displaying various elements and widgets on the page and the corresponding widget type for each. The widget tree may also visually define the contents of the project or software deliverable.

Figure 8:
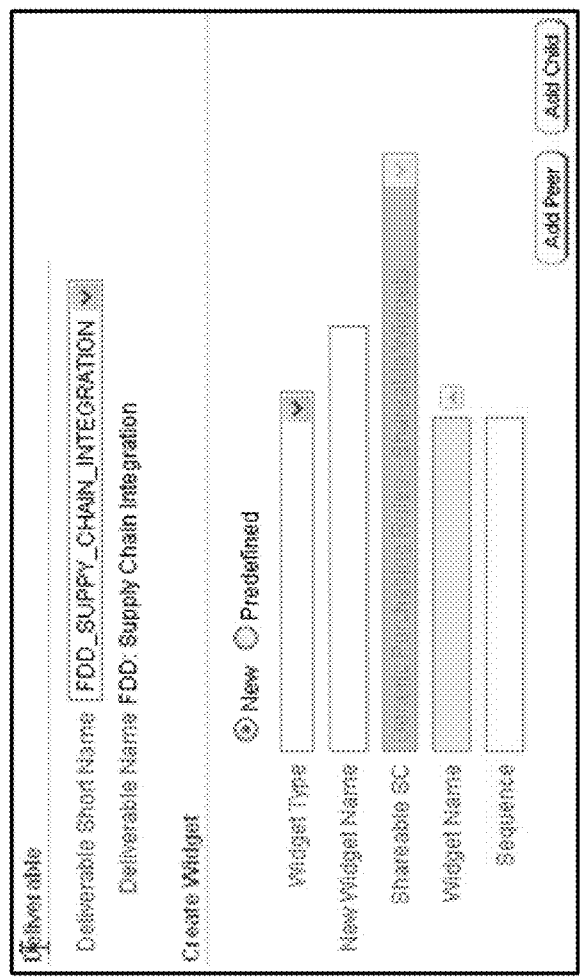
FIG. 8 illustrates an interface for adding widgets, according to one embodiment.

FIG. 8 illustrates an interface 800 for adding widgets, according to one embodiment. Note that widgets are classified as components or software components as discussed throughout this disclosure. Widgets may be assigned a particular software deliverable or software project. Widgets may also be given a widget type, such as backend attribute, backend parent, button, list of values filter, menu bar, toolbar item, nonsearch region, page, pop-up/cover/contextual action, saved search, search attribute, search region, tab, table, table column, UI field label, and/or the like. Widgets may also be given a distinctive name that is descriptive of their operation or placement on the page.

In order to be reusable, widgets may be based on other widgets and may be renamed, moved, sequenced, deleted, enable, or disabled according to each particular embodiment. For example, interface 800 includes buttons to add a widget as either a peer or a child in the widget tree of interface 700.

Figure 9:
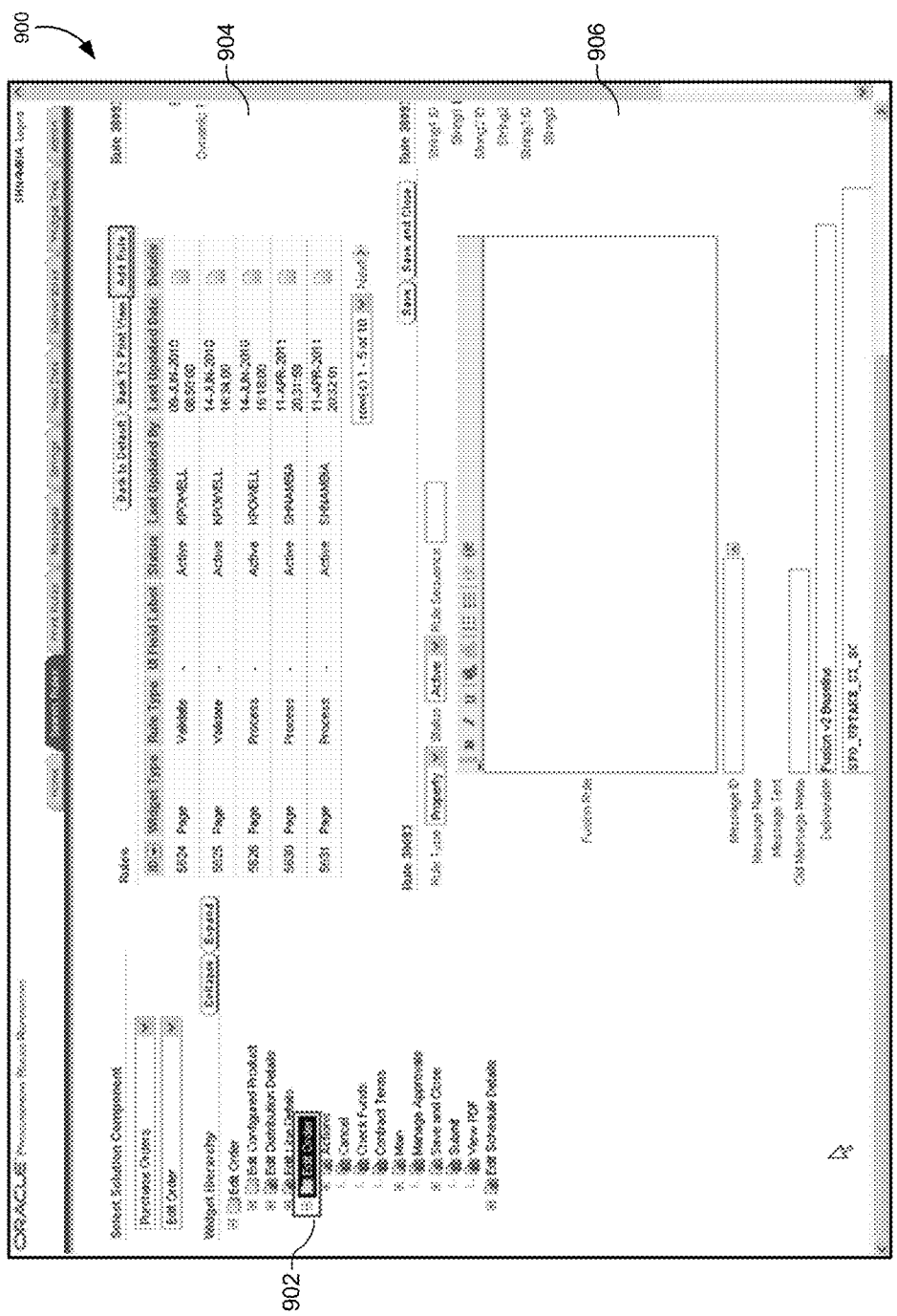
FIG. 9 illustrates an interface for creating or editing functional rules for components, according to one embodiment.

FIG. 9 illustrates an interface 900 for creating or editing functional rules for components, according to one embodiment. Interface 900 may be used as a main interface for navigating and/or managing components, functional rules, and/or the associations between functional rules and components. By selecting a component 902 in the widget hierarchy, the interface may display a listing 904 of each functional rule assigned to that widget. From the listing 904, functional rules may be removed from the selected component 902. The listing 904 may also display any metadata associated with the assigned functional rules, such as a unique ID, a rule type, and a status, along with a history of changes made to the functional rule, including who made the change and when the rule was last updated.

Additionally, interface 900 can be used to add a new rule to the selected component 902. By selecting an "Add Rule" input, the designer may use a part 906 of interface 900 to both define the operation of a rule, and to add any of the metadata described above in listing 904.

Figure 10:
FIG. 10 illustrates a listing of functional rule classifications, according to one embodiment.

FIG. 10 illustrates a listing 1000 of functional rule classifications, according to one embodiment. It may be useful to classify functional rules that can be authored in order to search and/or organize how they are displayed, accessed, printed, and/or stored. Listing 1000 includes eight specific rule types that may be used in a UI context. These rule types include property, default, derive, validate, display, edit, LOV, and process. An additional rule type can act as a catchall for rules and did not fit within one of the other specified categories. A rule type may be added to the metadata of a functional rule when it is created, and/or may be edited later during the software design process.

Figure 11:
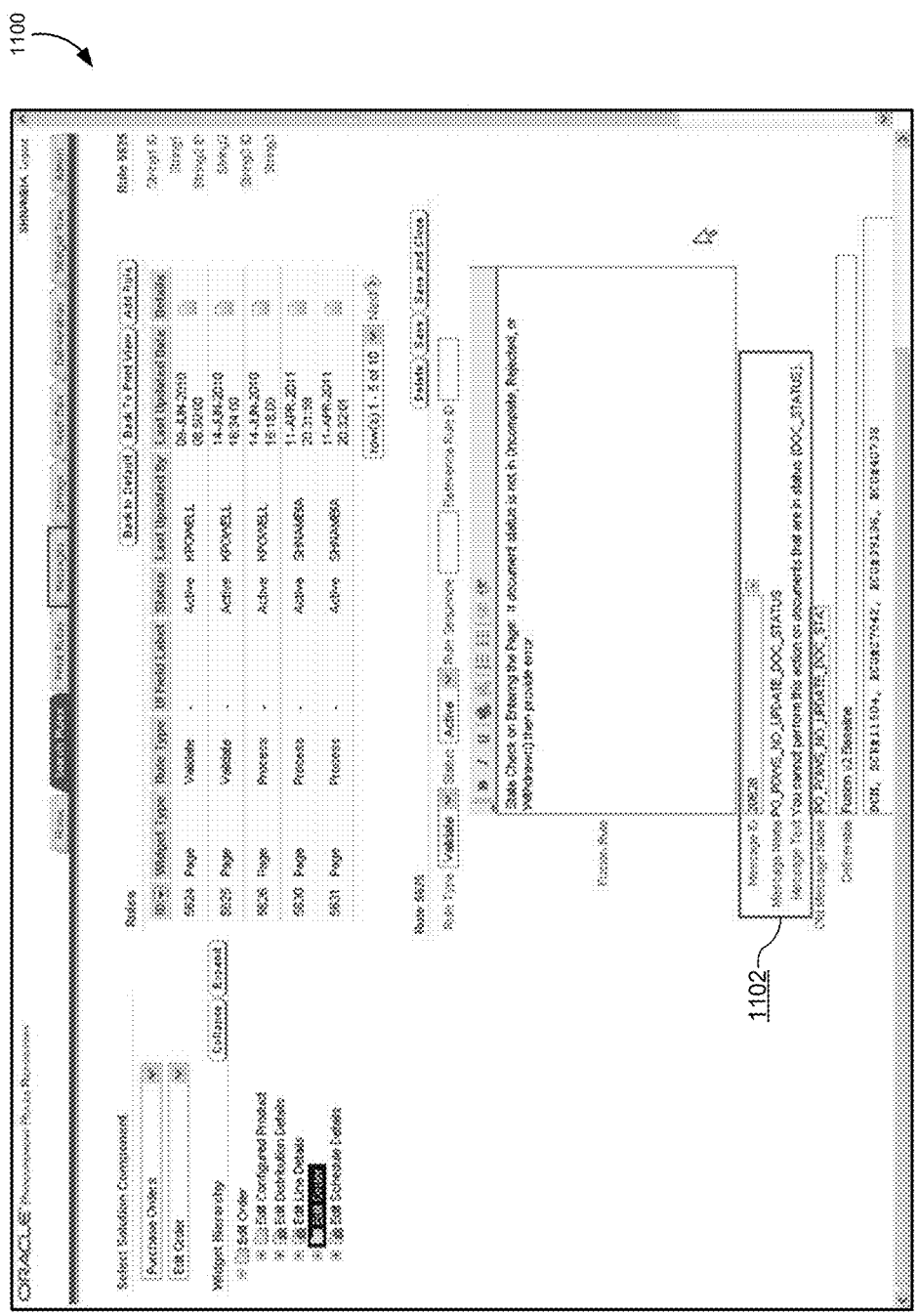
FIG. 11 illustrates an interface for referencing a predefined user message, according to one embodiment.
Figure 12:
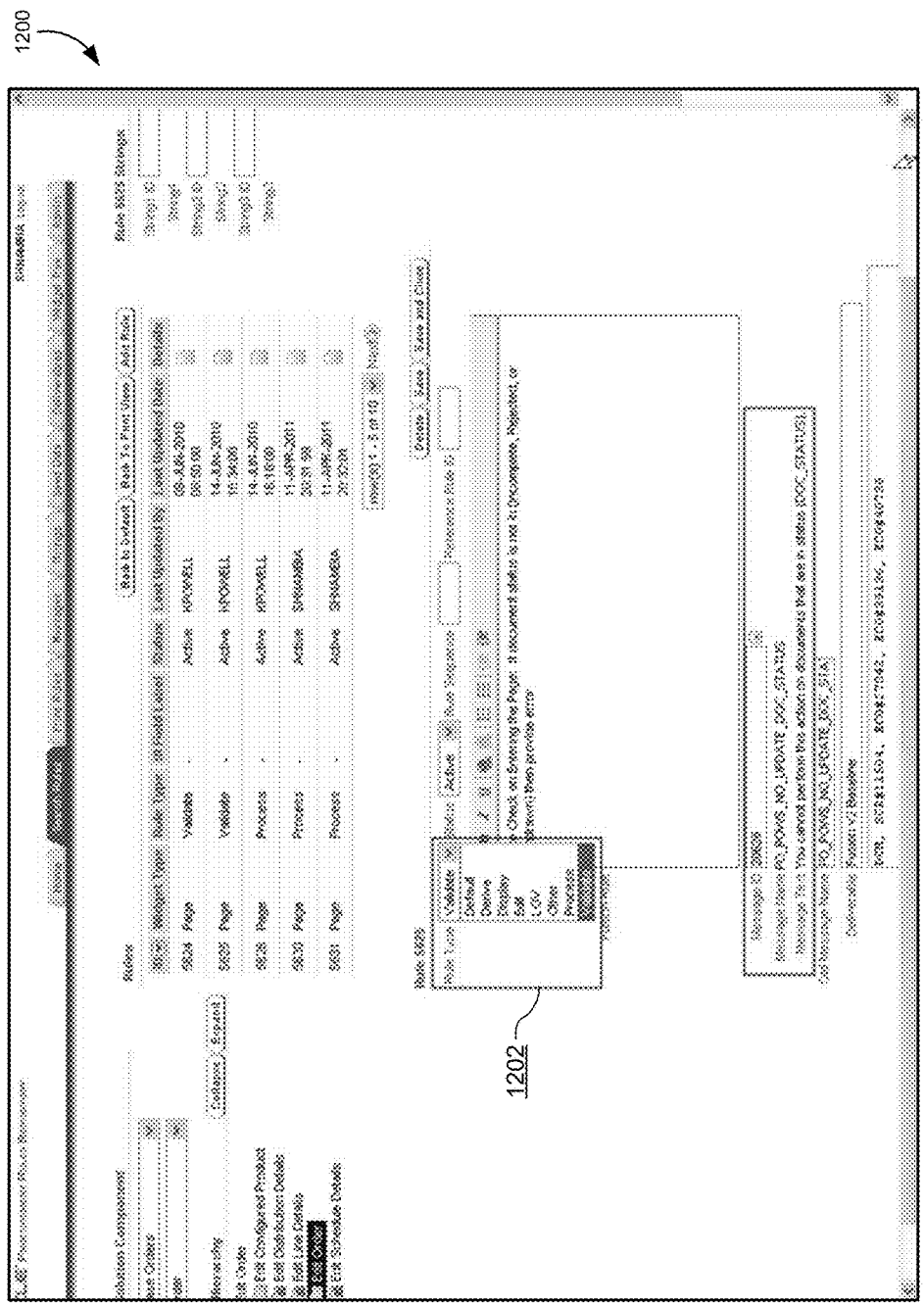
FIG. 12 illustrates an interface for classifying functional rules, according to one embodiment.
Figure 13:
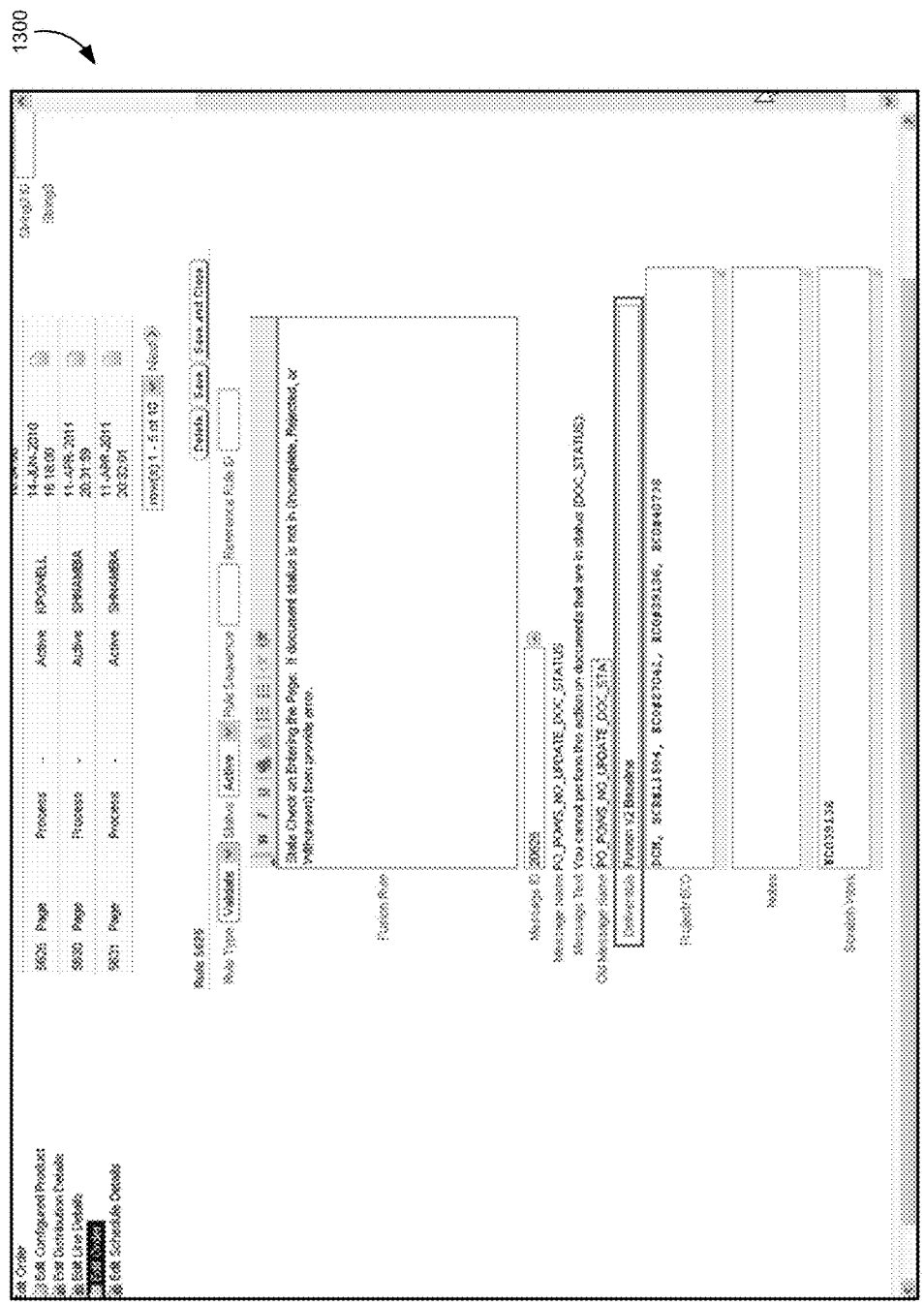
FIG. 13 illustrates an interface for versioning functional rules, according to one embodiment.

FIG. 11 illustrates an interface 1100 for referencing a predefined user message, according to one embodiment. Error messages may come in standard forms and formats that may be reused between various functional rules. The interface 1100 may include controls 1102 that identify particular error messages by a unique ID, name, and/or by text that is output to a user. Additionally, FIG. 12 illustrates how a rule type may be selected from a drop-down box 1202, according to one embodiment. In the same manner, a rule status, a rule sequence, and a rule reference ID may also be selected. FIG. 13 illustrates an interface 1300 for versioning functional rules, according to one embodiment. Each functional rule may be assigned to a particular software deliverable, and this metadata can be stored with the functional rule as described above. In short, these interfaces may be used to define all aspects of functional rules and make assignments to various components.

Figure 14:
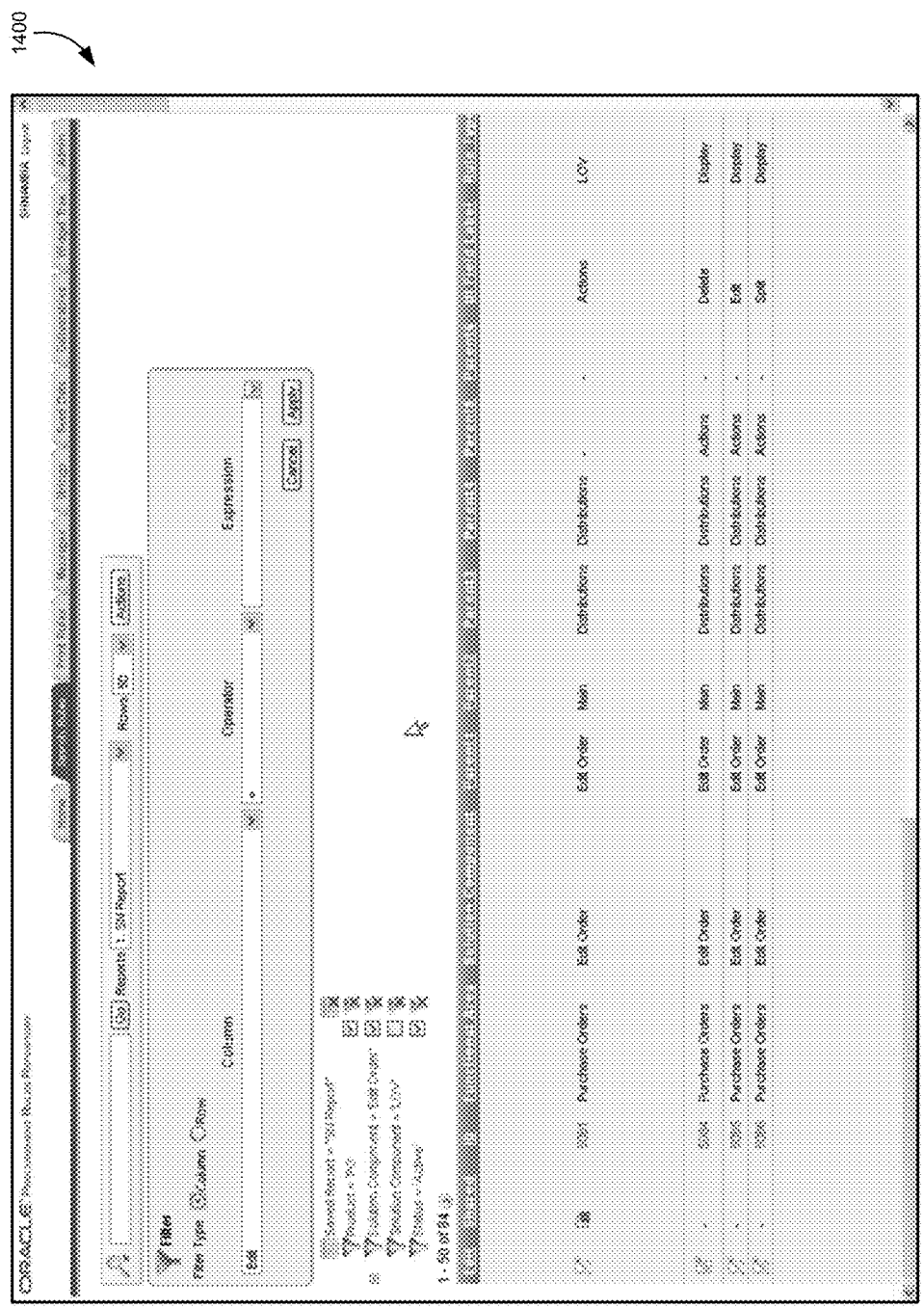
FIG. 14 illustrates an interface for searching functional rules, according to one embodiment.

FIG. 14 illustrates an interface 1400 for searching functional rules, according to one embodiment. Various filters may be used that correspond to functional rule metadata and/or component characteristics. Interface 1400 may be useful for keeping an audit trail of changes being made to a business rule. In some embodiments, a designer can update a business rule using only an active software deliverable. As used herein, a software deliverable may refer to a project or change request authorized by management for implementation on a software release. When a functional rule is updated using a new deliverable, the previous version of this functional rule can be archived and searched. Additionally, some embodiments may automatically keep track of the various deliverables that have updated a particular functional rule. This information can later be used to search and print functional rules that have been updated by a particular software deliverable.

As shown in interface 1400, various filters, logical operations, and other search parameters can be used in order to generate the desired listing of functional rules. For example, business rules may be searched according to functional areas, UI field labels, projects, and/or the like. Logical operators such as "=", "NOT", "AND", "CONTAINS", and/or the like, may be used to combine search terms.

Figure 15:
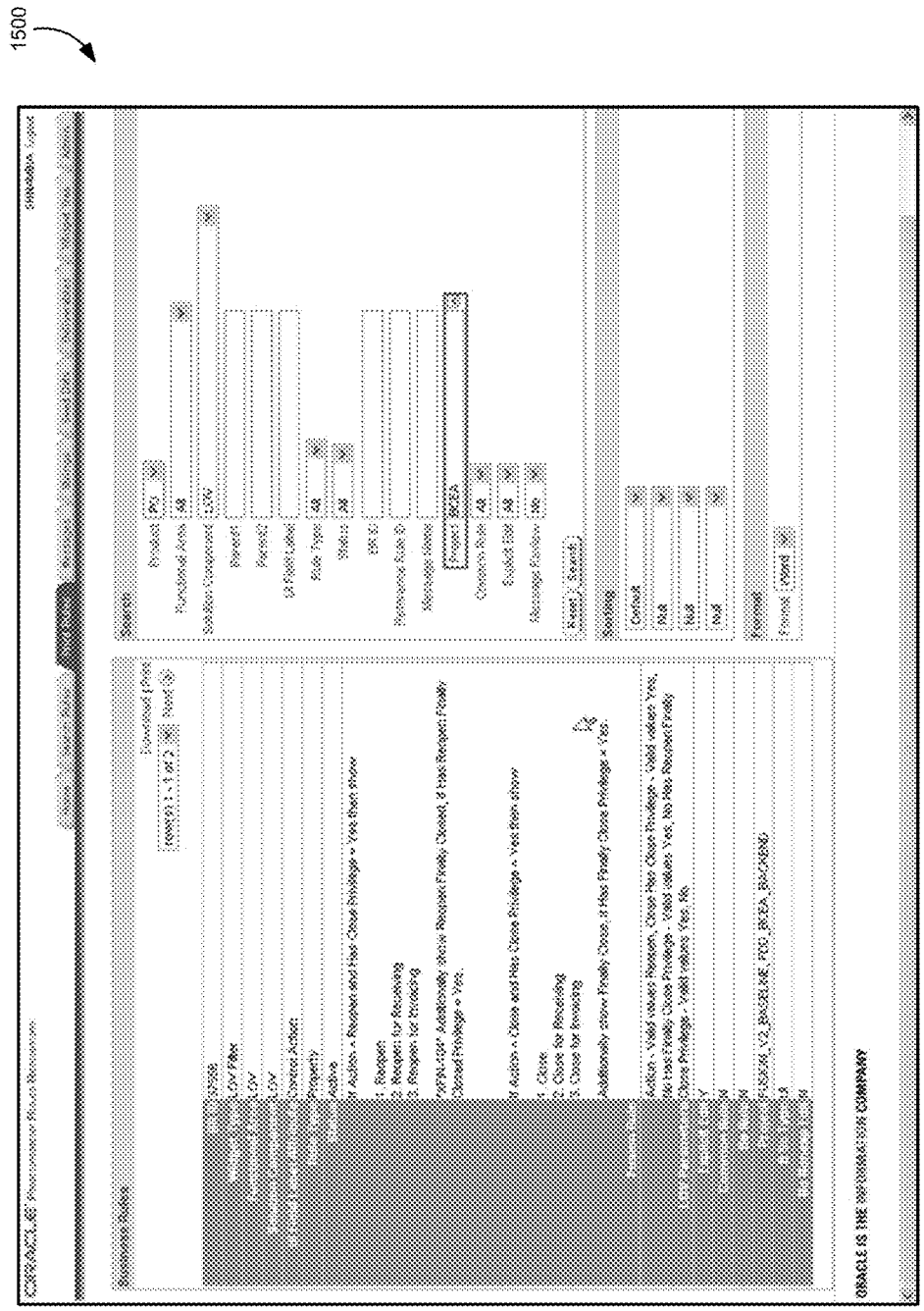
FIG. 15 illustrates an interface for searching functional rules in relation to a product and for printing in a reviewable format, according to one embodiment.
Figure 16:
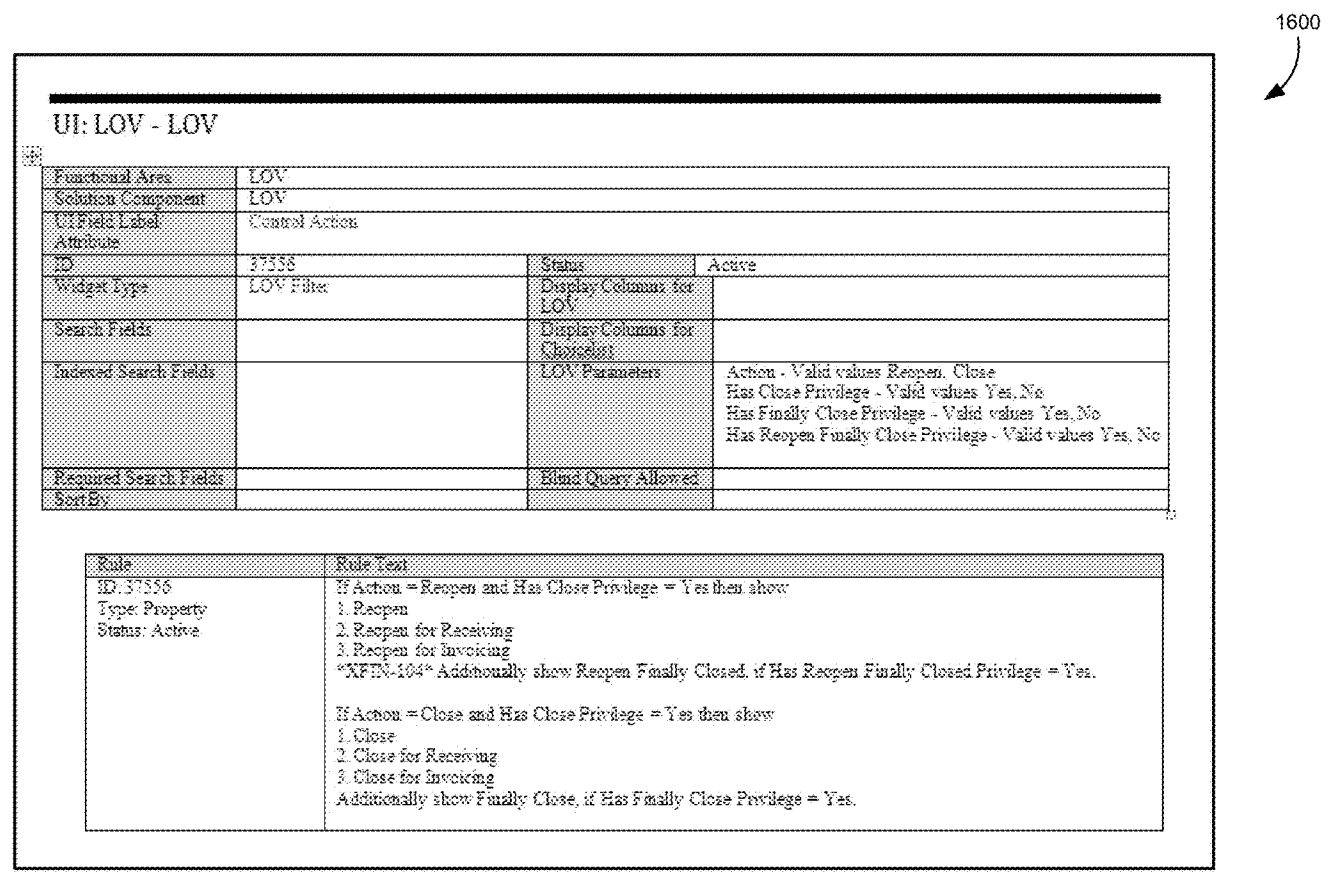

FIG. 15 illustrates an interface 1500 for searching functional rules in relation to a product, according to one embodiment. Interface 1500 provides the ability to search business rules for a given deliverable and print a report in a reviewable format. A designer can search for all business rules added or updated as part of a particular deliverable by specifying various print rules. The report may be printed in hard copy format or in a text document that can be used for electronic review. FIG. 16 illustrates an example of a functional rule search report 1600, according to one embodiment. Report 1600 lists all the functional rules assigned to the "LOV" functional area.

Figure 17:
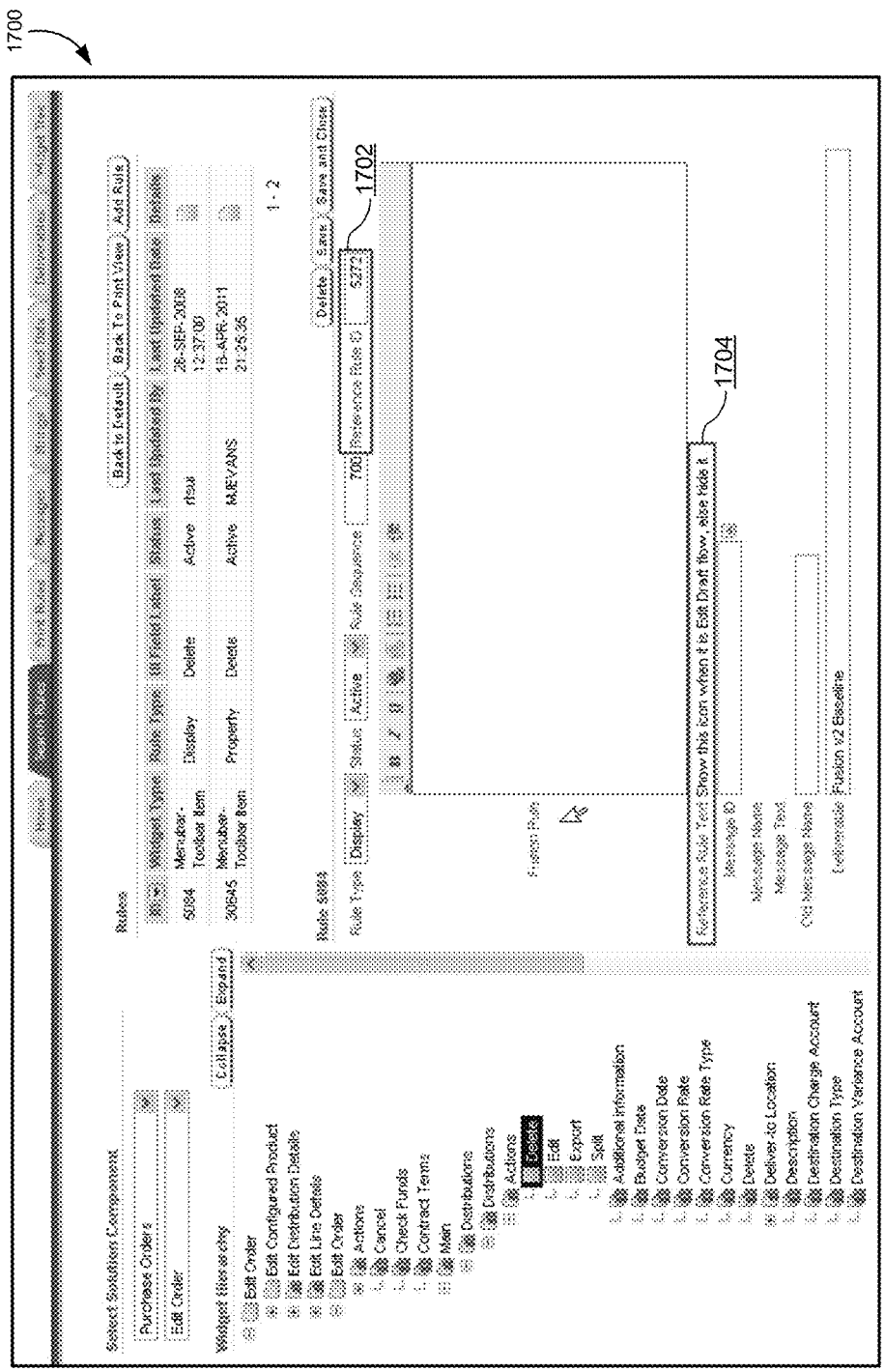
FIG. 17 illustrates an interface for reusing functional rules, according to one embodiment.

FIG. 17 illustrates an interface for reusing functional rules, according to one embodiment. In many instances, functional rules from a workstation interface may be nearly identical to validations to be performed when using a web interface. Some embodiments provide a mechanism to share functional rules within a component or across components. For example, interface 1700 illustrates the ability to reference an existing functional rule. In this example, a designer may create a business rule based on a component, and then reference the rule 1702, 1704 in another component or in the same component.

Figure 18A:
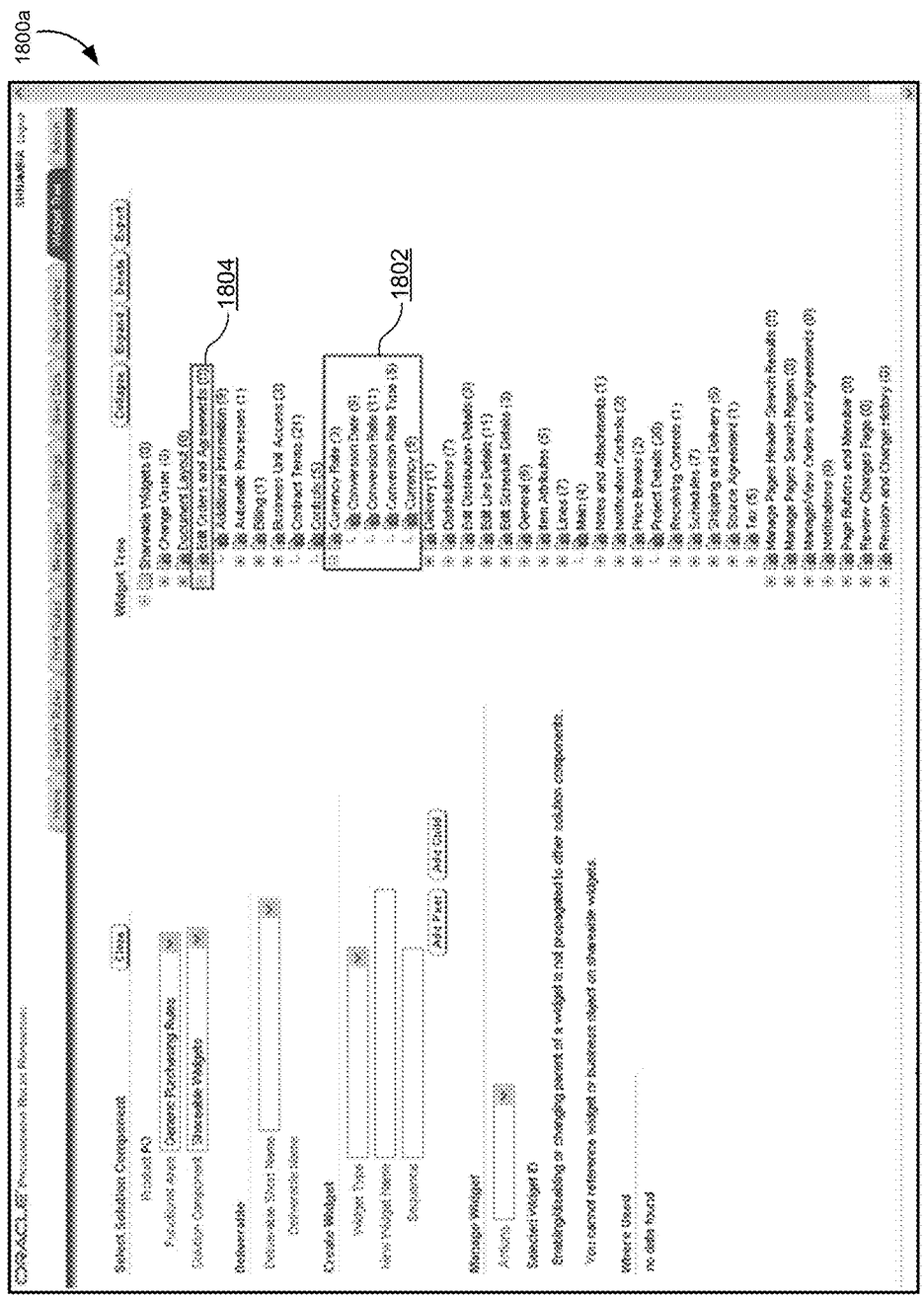
FIG. 18A illustrates an interface for creating shareable components, according to one embodiment.
Figure 18B:
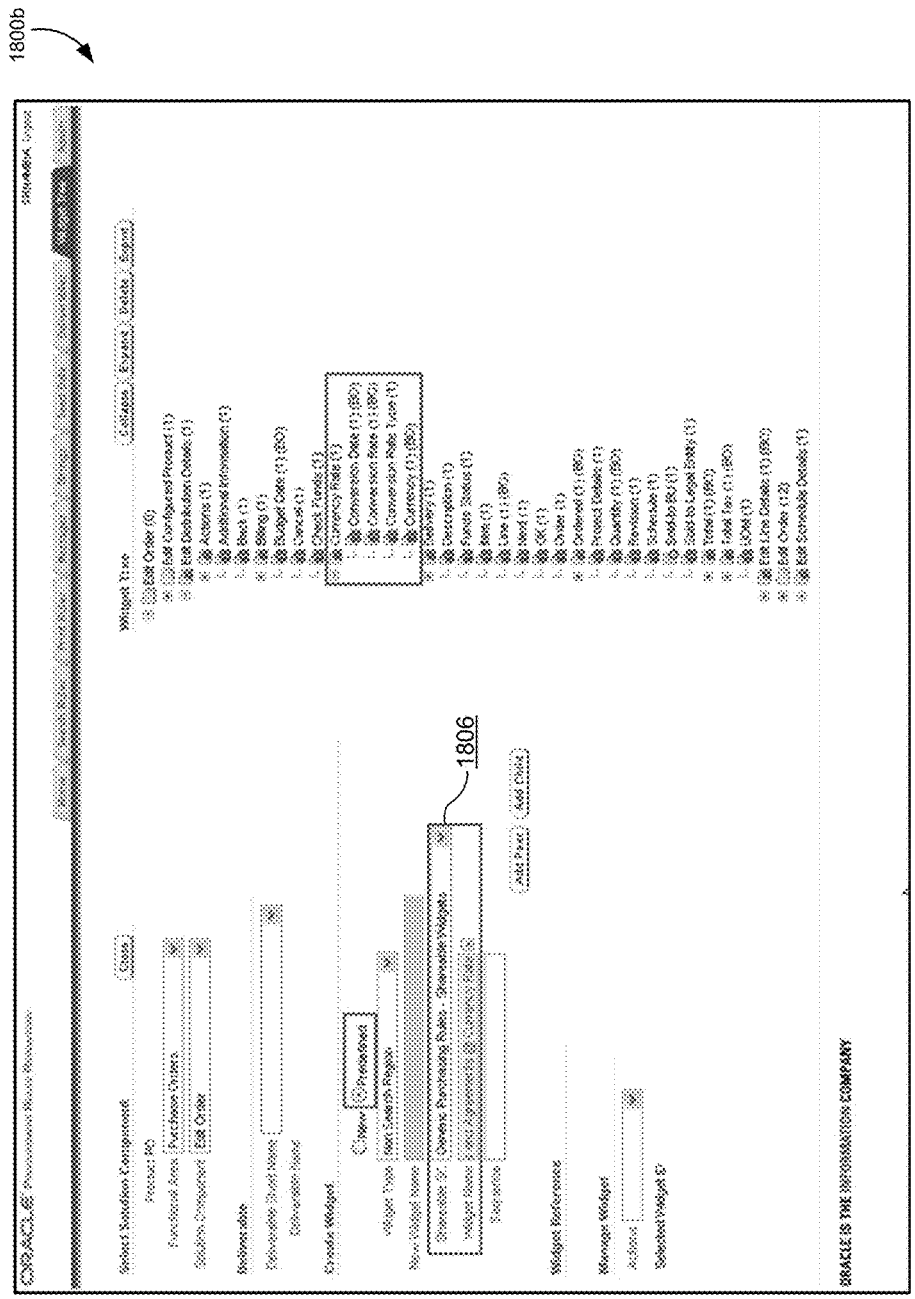
FIG. 18B illustrates a second interface for creating shareable components, according to one embodiment.

FIG. 18A illustrates an interface 1800a for creating shareable components, according to one embodiment. Some embodiments provide a mechanism to create shareable components that include the entire component structure. For example, interface 1800a illustrates a region 1802 for a currency rate. This region has a few attributes such as conversion date, conversion rate, conversion rate type, and/or currency. The currency rate region 1802 may also be needed in another component in addition to the "Edit Orders and Agreements" component 1804, such as the "Edit Order" component and/or the "Edit PO Change Order" component. Thus, components may need to be shared within a project and across different projects. FIG. 18B illustrates how a designer can add a predefined, shareable widget when constructing a widget tree for a particular software project. In this example, the "Currency Rate" region. Can be included in the "Edit Order" component.

Figure 19:
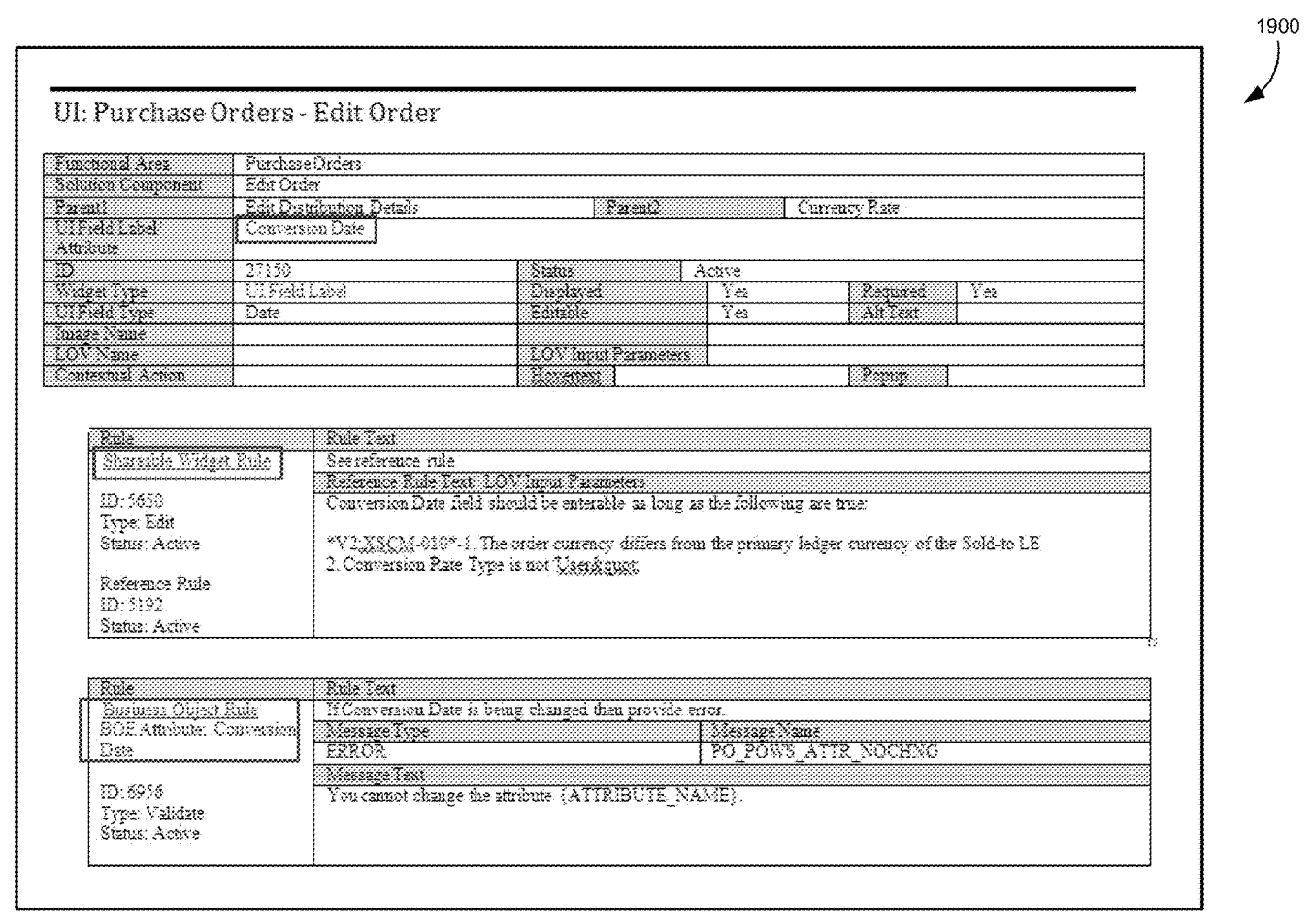

FIG. 19 illustrates an example of a functional rule report 1900 for a shareable component. Some embodiments may provide a mechanism to print shared functional rules. A designer can author a business rule on shareable components, and because of the association between the functional rule and the components, the functional rule can be inherited by sub components or attributes of the component. For example, FIG. 19 illustrates how a designer has printed functional rules on a "Edit Order" component with a "Conversion Date" attribute. Functional rule ID 6956 is included in the rule report 1900 because it is authored on the selected component In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of managing software design specifications with functional rule versioning, the method comprising:
   storing references to a plurality of software components in a database system;
   storing references to a plurality of functional rules in the database system, wherein the functional rules define behaviors that may be assigned to the plurality of software components;
   receiving a selection of two or more software components from the plurality of software components, wherein the two or more software components define a software product;
   assigning the plurality of functional rules to the two or more software components, wherein more than one of the plurality of functional rules are assigned to a single one of the two or more software components, wherein more than one of the two or more software components are assigned to a single one of the plurality of functional rules, and wherein at least one of the plurality of functional rules are assigned to software components defining a second software product;
   providing an interface for navigating through the two or more software components and editing the assignments;
   receiving a query for the software product; and
   providing an output comprising a listing of each functional rule assigned to software components of the software product.

2. The method of claim 1 further comprising:
   receiving an assignment of a first functional rule to a first software component, wherein the first software component is part of a first selection of software components that defines a first software product; and
   receiving an assignment of the first functional rule to a second software component, wherein the second software component is part of a second selection of software components that defines a second software product.

3. The method of claim 2 further comprising:
   receiving a change to the first functional rule; and
   archiving a history of changes to the first functional rule in the database system.

4. The method of claim 3 further comprising:
   receiving a query for the first functional rule; and
   providing an output, the output comprising:
      a definition of the first functional rule;
      the history of changes to the first functional rule;
      an indication that the first functional rule is assigned to the first software component; and
      an indication that the first functional rule is assigned to the second software component.

5. The method of claim 1 further comprising:
receiving an assignment of a first functional rule to a first software component, wherein the first software component is part of a first selection of software components that defines a first software product; and
receiving an assignment of a second functional rule to the first software component, wherein the first software component is part of a second selection of software components that defines a second software product.

6. The method of claim 1 wherein the plurality of software components comprises graphical components of a Graphical User Interface (GUI).

7. The method of claim 1 wherein the selection of the two or more software components are related to each other in a logical hierarchy.

8. The method of claim 7 further comprising:
providing a graphical display of the logical hierarchy;
receiving a selection of a first software component in the logical hierarchy; and
providing a listing of each functional rule assigned to the first software component.

9. The method of claim 1 wherein the software product comprises a GUI for a purchasing application of an Enterprise Software Suite.

10. The method of claim 1 wherein each of the functional rules is assigned a category.

11. A computer-readable memory comprising a sequence of instructions which, when executed by one or more processors, causes the one or more processors to manage software design specifications with functional rule versioning by:
storing references to a plurality of software components in a database system;
storing references to a plurality of functional rules in the database system, wherein the functional rules define behaviors that may be assigned to the plurality of software components;
receiving a selection of two or more software components from the plurality of software components, wherein the two or more software components define a software product;
assigning the plurality of functional rules to the two or more software components, wherein more than one of the plurality of functional rules are assigned to a single one of the two or more software components, wherein more than one of the two or more software components are assigned to a single one of the plurality of functional rules, and wherein at least one of the plurality of functional rules are assigned to software components defining a second software product;
providing an interface for navigating through the two or more software components and editing the assignments;
receiving a query for the software product; and
providing an output comprising a listing of each functional rule assigned to software components of the software product.

12. The computer-readable memory according to claim 11 wherein the instructions further cause the one or more processors to manage software design specifications with functional rule versioning by:
receiving an assignment of a first functional rule to a first software component, wherein the first software component is part of a first selection of software components that defines a first software product; and
receiving an assignment of the first functional rule to a second software component, wherein the second software component is part of a second selection of software components that defines a second software product.

13. The computer-readable memory according to claim 12 wherein the instructions further cause the one or more processors to manage software design specifications with functional rule versioning by:
receiving a change to the first functional rule; and
archiving a history of changes to the first functional rule in the database system.

14. The computer-readable memory according to claim 13 wherein the instructions further cause the one or more processors to manage software design specifications with functional rule versioning by:
receiving a query for the first functional rule; and
providing an output comprising:
a definition of the first functional rule;
the history of changes to the first functional rule;
an indication that the first functional rule is assigned to the first software component; and
an indication that the first functional rule is assigned to the second software component.

15. The computer-readable memory according to claim 11 wherein the instructions further cause the one or more processors to manage software design specifications with functional rule versioning by:
receiving an assignment of a first functional rule to a first software component, wherein the first software component is part of a first selection of software components that defines a first software product; and
receiving an assignment of a second functional rule to the first software component, wherein the first software component is part of a second selection of software components that defines a second software product.

16. The computer-readable memory according to claim 11 wherein the plurality of software components comprises graphical components of a Graphical User Interface (GUI).

17. A system comprising:
one or more processors; and
a memory communicatively coupled with and readable by the one or more processors and comprising a sequence of instructions which, when executed by the one or more processors, cause the one or more processors to manage software design specifications with functional rule versioning by:
storing references to a plurality of software components in a database system;
storing references to a plurality of functional rules in the database system, wherein the functional rules define behaviors that may be assigned to the plurality of software components;
receiving a selection of two or more software components from the plurality of software components, wherein the two or more software components define a software product;
assigning the plurality of functional rules to the two or more software components, wherein more than one of the plurality of functional rules are assigned to a single one of the two or more software components, wherein more than one of the two or more software components are assigned to a single one of the plurality of functional rules, and wherein at least one of the plurality of functional rules are assigned to software components defining a second software product;

providing an interface for navigating through the two or more software components and editing the assignments;

receiving a query for the software product; and providing an output comprising a listing of each functional rule assigned to software components of the software product.

18. The system of claim 17 wherein the instructions further cause the one or more processors to manage software design specifications with functional rule versioning by:

providing a graphical display of the logical hierarchy;

receiving a selection of a first software component in the logical hierarchy; and providing a listing of each functional rule assigned to the first software component.

19. The system of claim 17 wherein the selection of the two or more software components are related to each other in a logical hierarchy.

20. The system of claim 17 wherein the instructions further cause the one or more processors to manage software design specifications with functional rule versioning by:

receiving an assignment of a first functional rule to a first software component, wherein the first software component is part of a first selection of software components that defines a first software product;

receiving an assignment of the first functional rule to a second software component, wherein the second software component is part of a second selection of software components that defines a second software product;

receiving a change to the first functional rule;

archiving a history of changes to the first functional rule in the database system;

receiving a query for the first functional rule; and providing an output, the output comprising:
a definition of the first functional rule;
the history of changes to the first functional rule;
an indication that the first functional rule is assigned to the first software component; and
an indication that the first functional rule is assigned to the second software component.

\* \* \* \* \*

UNITED STATES PATENT AND TRADEMARK OFFICE
CERTIFICATE OF CORRECTION

PATENT NO. : 10,228,913 B2
APPLICATION NO. : 14/022711
DATED : March 12, 2019
INVENTOR(S) : Nambiar et al.

Page 1 of 1

It is certified that error appears in the above-identified patent and that said Letters Patent is hereby corrected as shown below:

In Column 15, Line 63, after "component" insert -- . --.

Signed and Sealed this
Twenty-fifth Day of February, 2020

Andrei Iancu
*Director of the United States Patent and Trademark Office*